US009589527B2

(12) United States Patent
Hong et al.

(10) Patent No.: US 9,589,527 B2
(45) Date of Patent: Mar. 7, 2017

(54) DISPLAY DEVICE INCLUDING DRIVING CIRCUIT TO PREVENT VIBRATION NOISE

(71) Applicant: Samsung Display Co., Ltd., Yongin (KR)

(72) Inventors: Hyun Seok Hong, Asan-si (KR); Yeon-Sun Na, Yongin-si (KR); Dongin Kim, Suwon-si (KR); Kwan-Young Oh, Hwaseong-si (KR); Changgil Oh, Daegu (KR); Bum Lee, Cheonan-si (KR); Jae-Won Jeong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 313 days.

(21) Appl. No.: 14/309,663

(22) Filed: Jun. 19, 2014

(65) Prior Publication Data

US 2015/0170603 A1 Jun. 18, 2015

(30) Foreign Application Priority Data

Dec. 12, 2013 (KR) ........................ 10-2013-0154831

(51) Int. Cl.
*G06F 3/038* (2013.01)
*G09G 3/36* (2006.01)
*G09G 3/20* (2006.01)

(52) U.S. Cl.
CPC ............ *G09G 3/3696* (2013.01); *G09G 3/20* (2013.01); *G09G 2330/028* (2013.01); *G09G 2360/16* (2013.01)

(58) Field of Classification Search
CPC .... G09G 3/3696; G09G 3/20; G09G 2360/16; G09G 2330/028
See application file for complete search history.

(56) References Cited

U.S. PATENT DOCUMENTS

| | | | | |
|---|---|---|---|---|
| 9,257,099 | B2 * | 2/2016 | Koo | G09G 5/20 |
| 2006/0050042 | A1 * | 3/2006 | Yi | G09G 3/3696 345/98 |
| 2013/0076150 | A1 | 3/2013 | Wagoner et al. | |
| 2013/0166076 | A1 | 6/2013 | Karr | |

FOREIGN PATENT DOCUMENTS

| | | |
|---|---|---|
| JP | 05-235926 | 9/1993 |
| KR | 10-0825096 | 4/2008 |
| KR | 10-2009-0030091 | 3/2009 |
| KR | 10-0959780 | 5/2010 |
| KR | 10-2011-0072868 | 6/2011 |
| KR | 10-1056373 | 8/2011 |

* cited by examiner

*Primary Examiner* — Rodney Amadiz
(74) *Attorney, Agent, or Firm* — H.C. Park & Associates, PLC

(57) ABSTRACT

A display device including a display panel, including a plurality of pixels, a driver circuit configured to display an image on the display panel in response to an image signal and a control signal, and a voltage generator configured to generate an analog driving voltage for an operation of the driver circuit in response to a voltage control signal. The driver circuit is configured to compare the image signal to ripple image patterns and is configured to output the voltage control signal to change a voltage level of the analog driving voltage, according to the result of the comparison.

15 Claims, 14 Drawing Sheets

DISPLAY DEVICE INCLUDING DRIVING CIRCUIT TO PREVENT VIBRATION NOISE

CROSS-REFERENCE TO RELATED APPLICATIONS

This application claims priority from and the benefit of Korean Patent Application No. 10-2013-0154831, filed on Dec. 12, 2013, which is hereby incorporated by reference for all purposes as if fully set forth herein.

BACKGROUND

Field

The inventive concepts described herein relate to a display device.

Discussion of the Background

A multi-layered ceramic capacitor (MLCC) may be a chip-type condenser that is mounted on printed circuit boards of such electronic devices as a display device, a mobile terminal, a notebook computer, a personal computer, a personal digital assistants (PDA), etc. and is used to charge and discharge electricity. The multi-layered ceramic capacitor may have various sizes and various stacked shapes according to its use and capacity.

In general, the multi-layered ceramic capacitor may have such a structure that internal electrodes having different polarities are alternately stacked between dielectric layers. Since the multi-layered ceramic capacitor is small-sized, has a large capacity, and is easy to mount, it may be used as a component of various electronic devices.

A ferroelectric material (e.g., barium titanate) with relatively high permittivity may be used as a ceramic material forming a stack body of the multi-layered ceramic capacitor. When an electric field is forced to the ferroelectric material, stress and mechanical transformation may appear as vibration. The reason may be that the ferroelectric material has piezoelectricity and electrostriction. Such vibration may be transferred from a terminal electrode of the multi-layered ceramic capacitor toward a substrate. For example, when an AC voltage is applied to the multi-layered ceramic capacitor, the multi-layered ceramic capacitor may experience stress. In this case, the multi-layered ceramic capacitor may vibrate by the stress. If the vibration is transferred from the terminal electrode to the substrate, the whole substrate may become a sound radiating surface to generate a noisy vibration source. The vibration sound may have an audible frequency of 20 Hz to 20 kHz, and it may irritate a person using the device.

Generally, a display device may include a voltage generator which converts a power supply voltage supplied from an external device into an internal power supply voltage. The voltage generator may utilize the multi-layered ceramic capacitor to generate the internal power supply voltage stably. The above-described vibration sound generated from the display device may irritate the user even further.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a display device including a driving circuit that may prevent vibration noise in driving the display.

Additional features of the invention will be set forth in the description which follows, and in part will be apparent from the description, or may be learned by practice of the invention.

An exemplary embodiment of the present invention discloses a display device including a display panel, including a plurality of pixels, a driver circuit configured to display an image on the display panel in response to an image signal and a control signal, and a voltage generator configured to generate an analog driving voltage for an operation of the driver circuit in response to a voltage control signal. The driver circuit is configured to compare the image signal to ripple image patterns and is configured to output the voltage control signal to change a voltage level of the analog driving voltage, according to the result of the comparison.

An exemplary embodiment of the present invention also discloses a method of driving a display panel, the method including comparing an image signal to ripple image patterns, outputting a voltage control signal in response to the comparison, generating an analog driving voltage in response to the voltage control signal, and outputting gray scale voltages for driving a plurality of data lines in response to an image data signal and the analog driving voltage.

With an embodiment of the inventive concepts, a voltage level of an analog power supply voltage may be decreased when an image signal having a specific pattern causing an increase in a ripple of the analog power supply voltage is received. Thus, it is possible to minimize a vibration noise of a multi-layered capacitor of a voltage generator. This may mean that a noise of a display device including the voltage generator is minimized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
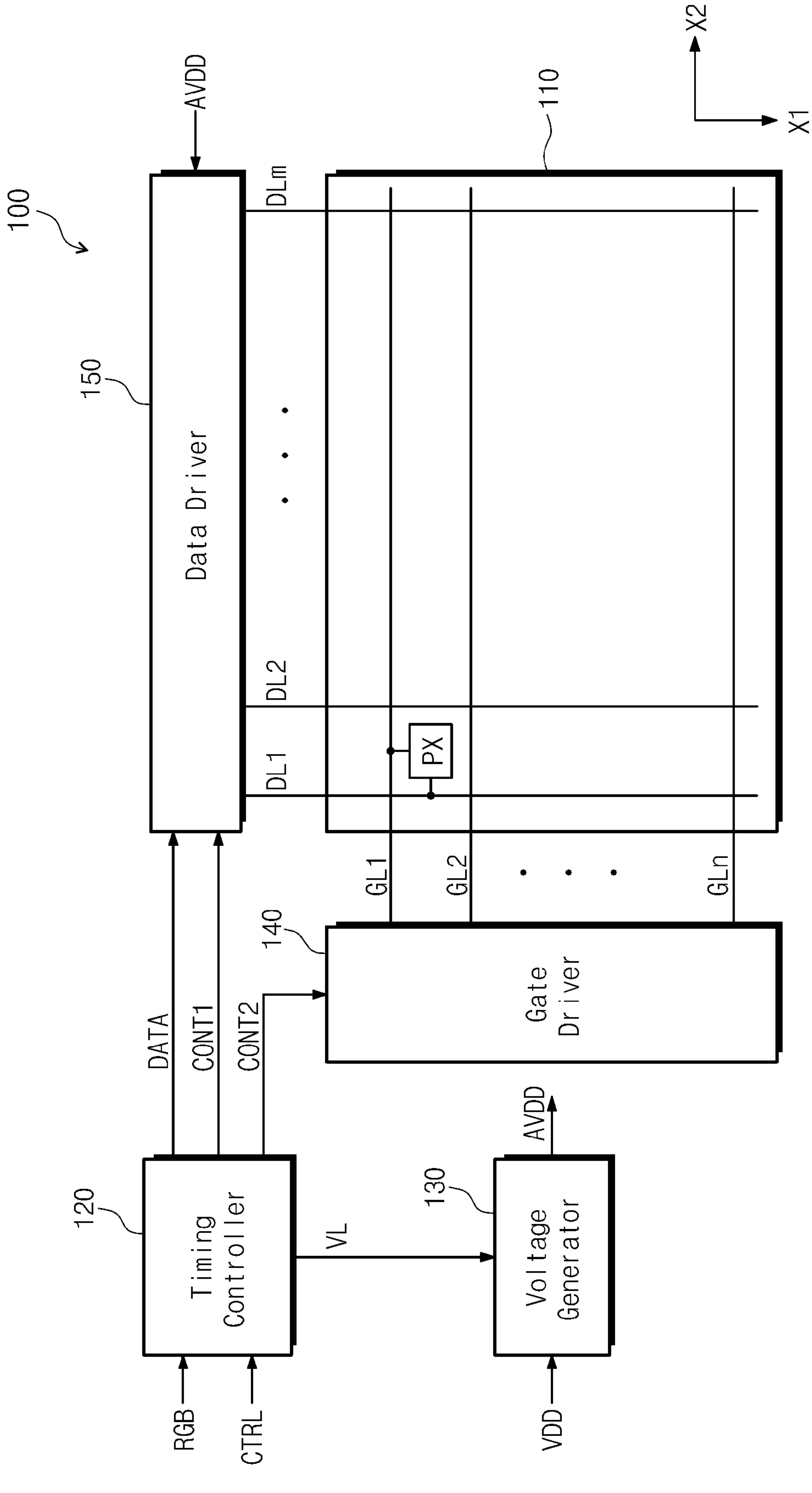
FIG. 1 is a block diagram schematically illustrating a display device according to an embodiment of the inventive concepts.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a display device 100 according to an embodiment of the present invention. A liquid crystal display device is illustrated and described as an example of the display device 100. However, the exemplary embodiments of the present invention are not limited thereto. The exemplary embodiments of the present invention may be applied to all display devices each having a voltage generator.

Referring to FIG. 1, the display device 100 may include a display panel 110, a timing controller 120, a voltage generator 130, a gate driver 140, and a data driver 150.

The display panel 110 may include a plurality of data lines DL1 to DLm extending along a first direction X1, a plurality of gate lines GL1 to GLn arranged to intersect with the data lines DL1 to DLm and extending along a second direction X2, and a plurality of pixels PX respectively arranged at intersections of the data lines DL1 to DLm and the gate lines GL1 to GLn. The plurality of data lines DL1 to DLm and the plurality of gate lines GL1 to GLn may be isolated.

Although not shown in FIG. 1, each of the pixels PX may include a switching transistor connected to a corresponding data line and to a corresponding gate line and a crystal capacitor and a storage capacitor connected to the switching transistor.

The timing controller 120, the gate driver 130, and the data driver 150 may constitute a driving circuit to control an operation of displaying an image on the display panel 110.

The timing controller 120 may receive an image signal RGB and control signals CTRL for controlling a display of the image signal RGB. The control signals CTRL may include a vertical synchronization signal Vsync, a horizontal synchronization signal Hsync, a main clock signal MCLK, a data enable signal DE, etc. The timing controller 120 may provide an image data signal DATA and a first control signal CONT1 to the data driver 140 and a second control signal CONT2 to the gate driver 130. The data signal DATA may be generated by processing the image signal RGB to be suitable for an operation condition of the display panel 110. The first control signal CONT1 may include a start pulse signal STH, a clock signal CLK, a polarity inversion signal POL, and a line latch signal LOAD, and the second control signal CONT2 may include a vertical synchronization start signal STV, an output enable signal OE, and a gate pulse signal CPV.

In exemplary embodiments, when an image signal RGB corresponds to one of ripple image patterns, the timing controller 120 may output a voltage control signal VL for changing a voltage level of an analog driving voltage AVDD.

The voltage generator 130 may convert a power supply voltage VDD provided from an external device into the analog driving voltage AVDD. The voltage generator 130 may further generate a common voltage VCOM needed for an operation of the display panel 110, a gate on voltage VON and a gate off voltage VOFF for an operation of the gate driver 140, and so on.

The gate driver 130 may drive the plurality of gate lines GL1 to GLn in response to the second control signal CONT2 from the timing controller 120. The gate driver 140 may include a gate driver integrated circuit. However, the exemplary embodiments of the present invention are not limited thereto. For example, the gate driver 140 may be implemented by circuits using an oxide semiconductor, an amorphous semiconductor, a crystalline semiconductor, a polycrystalline semiconductor, etc.

The data driver 150 may output gray scale voltages for driving the data lines DL1 to DLm, according to the image data signal DATA and the first control signal CONT1 from the timing controller 120.

While the gate driver 140 applies the gate on voltage VON to a gate line, a row of switching transistors the gate on voltage VON is applied to may be turned on. At this time, the data driver 150 may provide gray scale voltages corresponding to the image data signal DATA to the data lines DL1 to DLm. The gray scale voltages supplied to the data lines DL1 to DLm may be applied to liquid crystal capacitors and storage capacitors through the switching transistors thus turned on. Here, a period that a row of switching transistors is turned on, which is a period of the data enable signal DE, may be referred to as a "horizontal period" or "1H".

Figure 2:
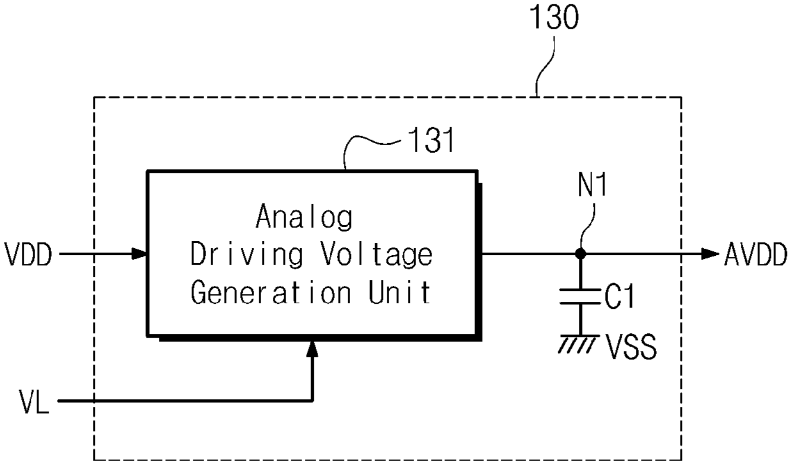
FIG. 2 is a diagram schematically illustrating a voltage generator shown in FIG. 1.

FIG. 2 is a diagram schematically illustrating a voltage generator 130 shown in FIG. 1.

Referring to FIG. 2, the voltage generator 130 may include an analog driving voltage generation unit 131 and a capacitor C1. The analog driving voltage generation unit 131 may convert a power supply voltage VDD provided from an external device into an analog driving voltage AVDD and output the analog driving voltage AVDD to an output terminal N1.

The capacitor C1 may be connected between the output terminal N1 and a ground voltage VSS.

Figure 3:
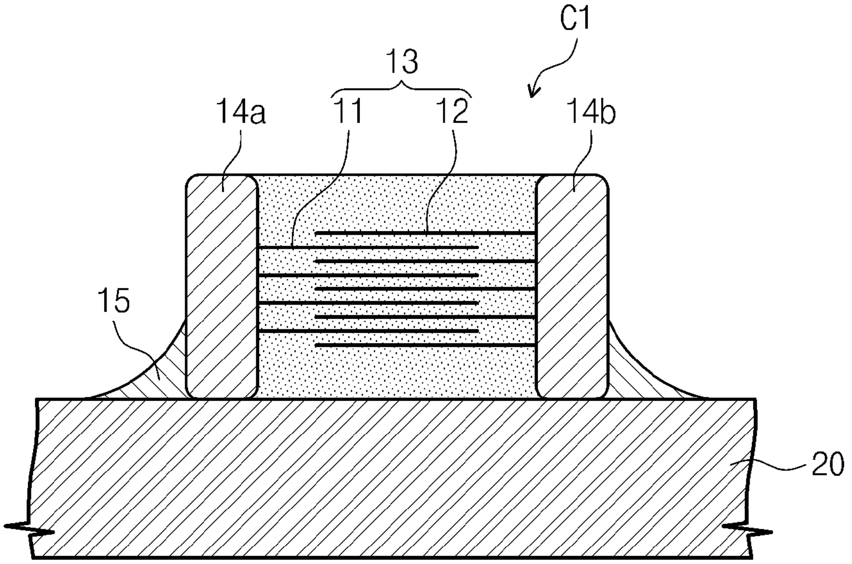
FIG. 3 is a cross-sectional view of a capacitor mounted on a circuit board.

FIG. 3 is a cross-sectional view of the capacitor C1 mounted on a circuit board.

Referring to FIG. 3, the capacitor C1 may be in the form of a multi-layered ceramic capacitor, and may include a structure 13 formed by alternately stacking a dielectric layer 11 and an internal electrode 12. The capacitor C1 includes a pair of external electrodes 14*a* and 14*b* disposed at both ends of the structure 13. One of the external electrodes 14*a* and 14*b* may be connected to the dielectric layers 11, and the other may be connected to the internal electrodes 12. The dielectric layers 11 may be formed of a ferroelectric material include barium titanate as a main component. However, the exemplary embodiments of the present invention are not limited thereto. For example, the dielectric layers 11 may be formed of any suitable ferroelectric material including the barium titanate.

The internal electrodes 12 may be formed of a metal thin film produced by sintering a metal paste. The metal paste may include metal materials as Ni, Pd, Ag—Pd, and Cu as a main component. The external electrodes 14*a* and 14*b* may be formed of metal materials such as Cu, Ni, etc. Tin-lead plating may be conducted on the surface of the external electrodes 14*a* and 14*b* to improve wetting of solder.

The capacitor C1 may be mounted on an area defined on a surface of a circuit board 20. The capacitor C1 mounted on the circuit board 20 may be electrically connected to a conduction pattern (not shown), which is formed on an upper surface of the circuit board 20, using a conduction material 15. All circuits of a voltage generator 140 including the capacitor C1 may be mounted on the circuit board 20.

The conduction material 15 including solder may act as a vibration medium between the capacitor C1 and the circuit board 20. A manufacturer of the multi-layered ceramic capacitor may restrict a vibration noise to be below 30 dB. However, a vibration noise of the capacitor C1 may still be caused from a periodically generated ripple of an analog driving voltage AVDD. In particular, in the event that an image signal RGB is periodically changed and a change level is large, the magnitude of the ripple of the analog driving voltage AVDD may increase. If the image signal RGB corresponds to one of ripple image patterns, the timing controller 120 shown in FIG. 1 may control the analog driving voltage AVDD to decrease its voltage level.

Figure 4:
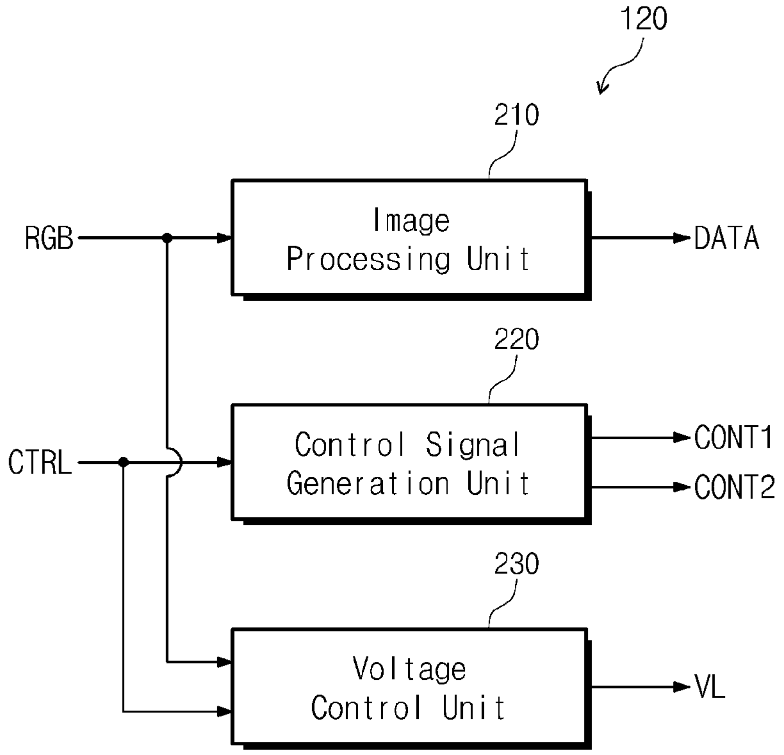
FIG. 4 is a block diagram schematically illustrating a timing controller shown in FIG. 1.

FIG. 4 is the block diagram schematically illustrating a timing controller shown in FIG. 1.

Referring to FIG. 4, a timing controller 120 may include an image processing unit 210, a control signal generation unit 220, and a voltage control unit 230. The image processing unit 210 may process an image signal RGB input from an external device to be suitable for an operation condition of a display panel 110 and may output an image data signal DATA as the processing result. The control signal generation unit 220 may generate a first control signal CONT1 and a second control signal CONT2 in response to a control signal CTRL. The first control signal CONT1 may include a first start pulse signal STH, a clock signal CLK, a polarity inversion signal POL, and a line latch signal LOAD, and the second control signal CONT2 may include a vertical synchronization start signal STV, an output enable signal OE, and a gate pulse signal CPV.

The voltage control unit 230 may output a voltage control signal VL in response to the image signal RGB and the control signal CTRL. The voltage control unit 230 may operate in synchronization with the control signal CTRL. When the image signal RGB corresponds to one of ripple image patterns, the voltage control unit 230 may output the voltage control signal VL.

Figure 5:
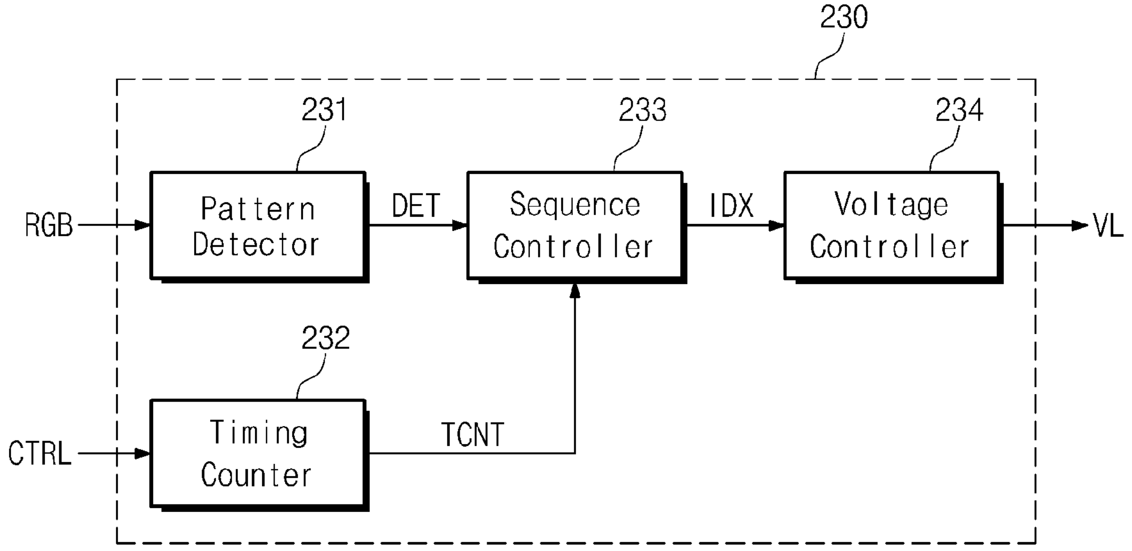
FIG. 5 is a block diagram schematically illustrating a voltage control unit 230 shown in FIG. 4.

FIG. 5 is a block diagram schematically illustrating a voltage control unit 230 shown in FIG. 4.

Referring to FIG. 5, a voltage control unit 230 may include a pattern generator 231, a timing counter 232, a sequence controller 233, and a voltage controller 234.

An image pattern may be stored in a memory (not shown). The memory for storing the image pattern may be provided within the timing controller 120 shown in FIG. 1 or outside the timing controller 120. The memory may store one or more ripple image patterns. The ripple image patterns refer to image patterns that may cause a ripple of an analog driving voltage AVDD.

The pattern detector 231 may determine whether an image signal RGB corresponds to one of ripple image patterns. For example, if the image signal RGB corresponds to one of the ripple image patterns, the pattern detector 231 may output a detection signal DET having an active level.

The timing counter 232 may output a timing signal TCNT in response to a vertical synchronization signal Vsync, horizontal synchronization signal Hsync, and data enable signal DE a control signal CTRL includes. The timing signal TCNT may be a pulse signal activated every 1H (1 horizontal period) or every frame.

The sequence controller 233 may receive a detection signal DET in synchronization with the timing signal TCNT. If the detection signal DET has an active level when the timing signal TCNT is activated, the sequence controller 233 may output an index signal IDX. For example, the index signal IDX may have an 8-bit width, and may have one of 256 levels (0 to 255).

The sequence controller 233 may store the following information in an internal memory (not shown).

a down start value IDX_SRT of the index signal IDX
a down stop value IDX_STOP of the index signal IDX
an up end value IDX_END of the index signal IDX
a down frame number IDX_DNF of the index signal IDX
a down step IDX_DNSTEP of the index signal IDX
an up frame number IDX_UPF of the index signal IDX
an up step IDX_UPSTEP of the index signal IDX If the detection signal DET has an active level when the timing signal TCNT is activated, the sequence controller 233 may set the index signal IDX to the down start value IDX_SRT. If the detection signal DET has an active level whenever the timing signal TCNT is activated, the sequence controller 233 may decrease the level of the index signal IDX, for example, by the down step IDX_DNSTEP. The down step IDX_DNSTEP may be set such that the level of the index signal IDX reaches the down stop value IDX_STOP within the maxim number of frames which is restricted by the down frame number IDX_DNF.

If the level of the index signal IDX reaches the down stop value IDX_STOP, the sequence controller 233 may maintain the level of index signal IDX regardless whether the detection signal DET has an active level when the timing signal TCNT is activated.

If the detection signal DET does not have an active level when the timing signal TCNT is activated, the sequence controller 233 may increase the level of the index signal IDX, for example, by the up step IDX_UPSTEP. The up step IDX_UPSTEP may be set such that the index signal IDX reaches the up stop value IDX_END within the maxim number of frames which is restricted by the up frame number IDX_UPF.

The sequence controller 233 may further conduct exception check. When an exception check flag has an active state, the level of the index signal IDX may not be changed regardless whether the detection signal DET has active level. Also, when the exception check flag is switched from an inactive state to an active state while the level of the index signal IDX is lower than the down start value IDX_SRT, the level of the index signal IDX may be quickly changed into the up end value IDX_END.

The voltage controller 234 may output a voltage control signal VL corresponding to the index signal IDX. The voltage controller 234 may output the voltage control signal VL corresponding to the index signal IDX according to a bias offset, multiplication factor, and division factor stored in an internal memory (not shown) or in a register (not shown).

Referring back to FIG. 1, when the timing controller is connected to a voltage generator 130 through an I2C (Inter-Integrated circuit) interface, the timing controller 120 may further include an I2C interface circuit. In this case, the I2C interface circuit may convert the voltage control signal VL into an I2C signal to output the I2C signal to the voltage generator 130.

Figure 6A:
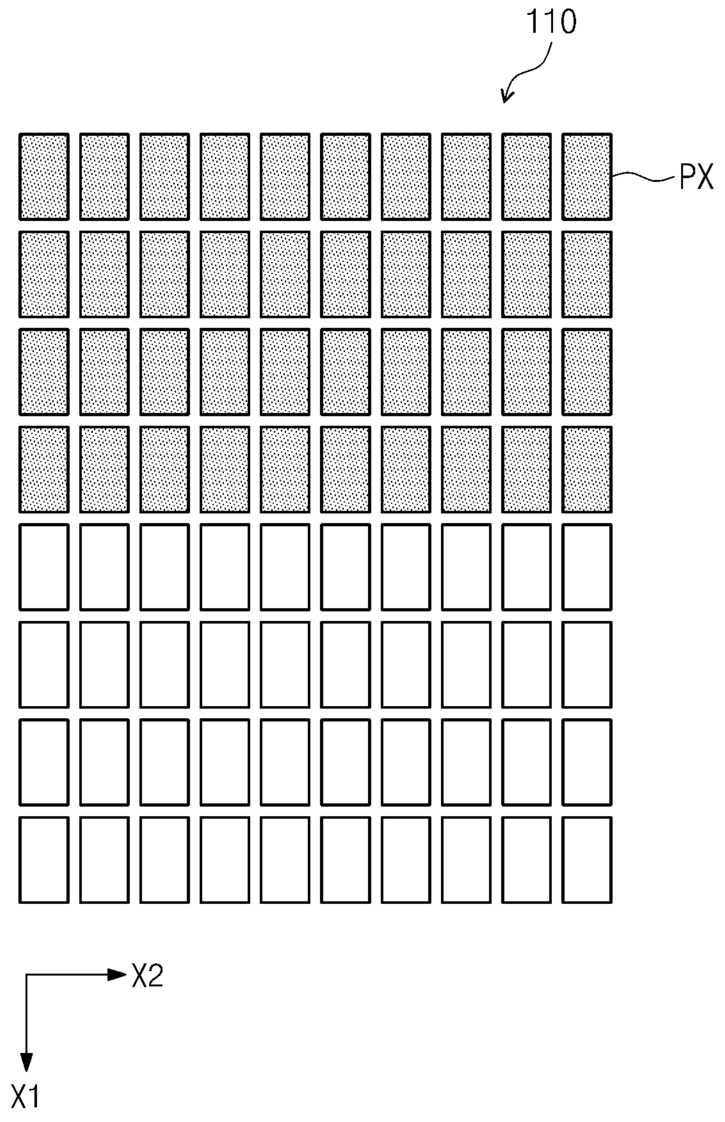
FIGS. 6A, 7A, and 8A are diagrams showing examples of an image displayed on a display panel.
Figure 7A:
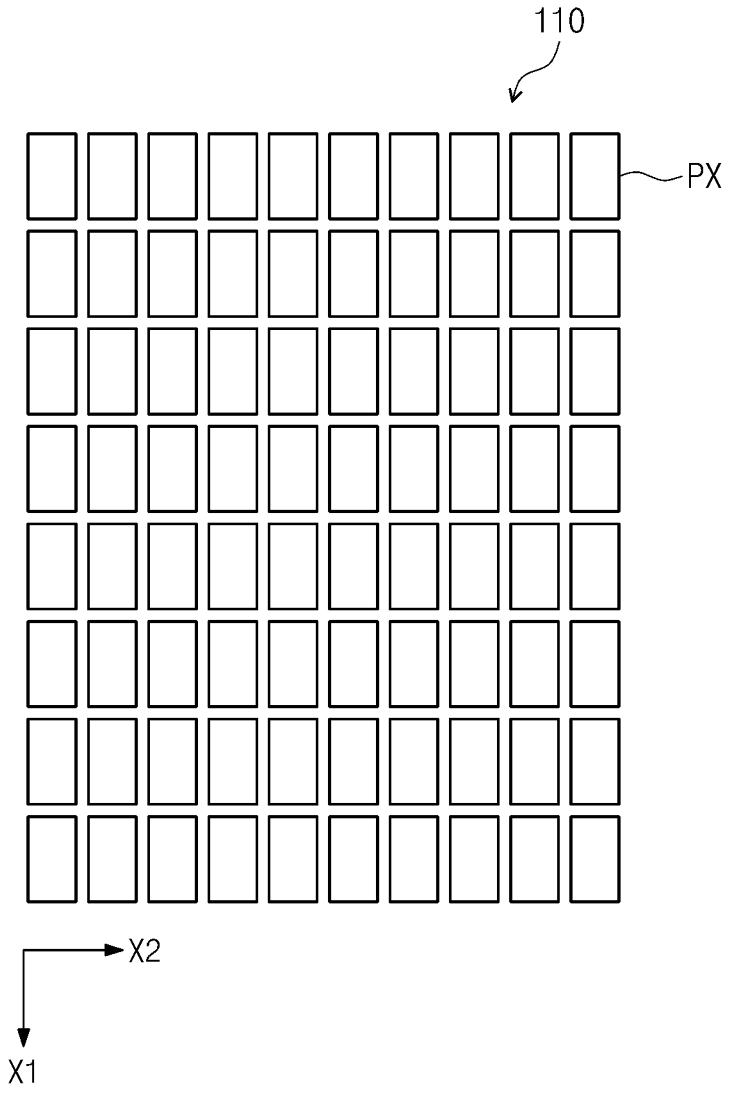
Figure 8A:
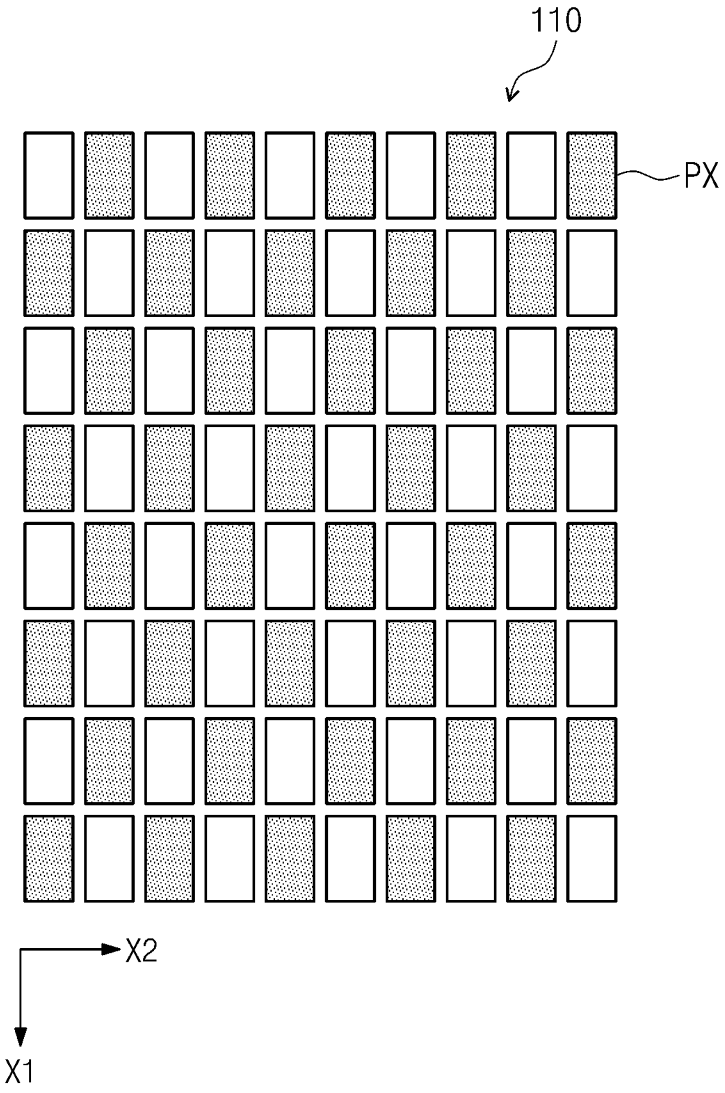

FIGS. 6A, 7A, and 8A are diagrams showing examples of an image displayed on a display panel, with respect to a voltage V over a time t.

Referring to FIG. 6A, a display panel 110 may include a plurality of pixels PX arranged along a first direction X1 and a second direction X2. According to the present example, an image signal RGB corresponding to the maximum gray scale and an image signal RGB corresponding to the minimum gray scale maybe alternately input to the display panel 110 in the first direction X1 every other four-lines during one frame, and a ripple of an analog driving voltage AVDD may be generated due to a variation in the amount of charges discharged through a liquid crystal capacitor of a pixel PX.

An image signal RGB provided to a display device 100 may include a blank period BP every frame. One frame may have a period of 60 Hz, 120 Hz, or 240 Hz, corresponding to an audible frequency. In particular, if an image signal RGB corresponding to the maximum gray scale and an image signal RGB corresponding to the minimum gray scale are alternately input every period, a ripple of the analog driving voltage AVDD may increase. A capacitor C1 shown in FIG. 2 may vibrate from the ripple of the analog driving voltage AVDD output to an output terminal N1 connected to the capacitor C1. In this case, a vibration noise may be generated.

Figure 6B:
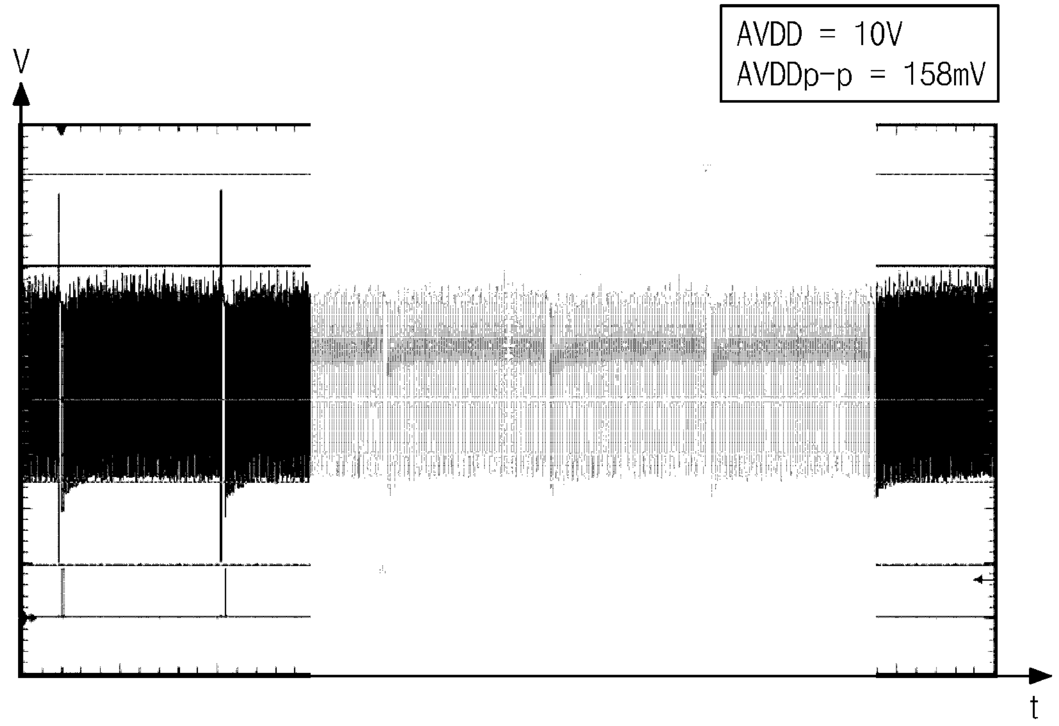
FIGS. 6B and 6C are diagrams showing a variation in an analog driving voltage that a voltage generator shown in FIG. 1 generates, when an image shown in FIG. 6A is displayed on a display panel.
Figure 6C:
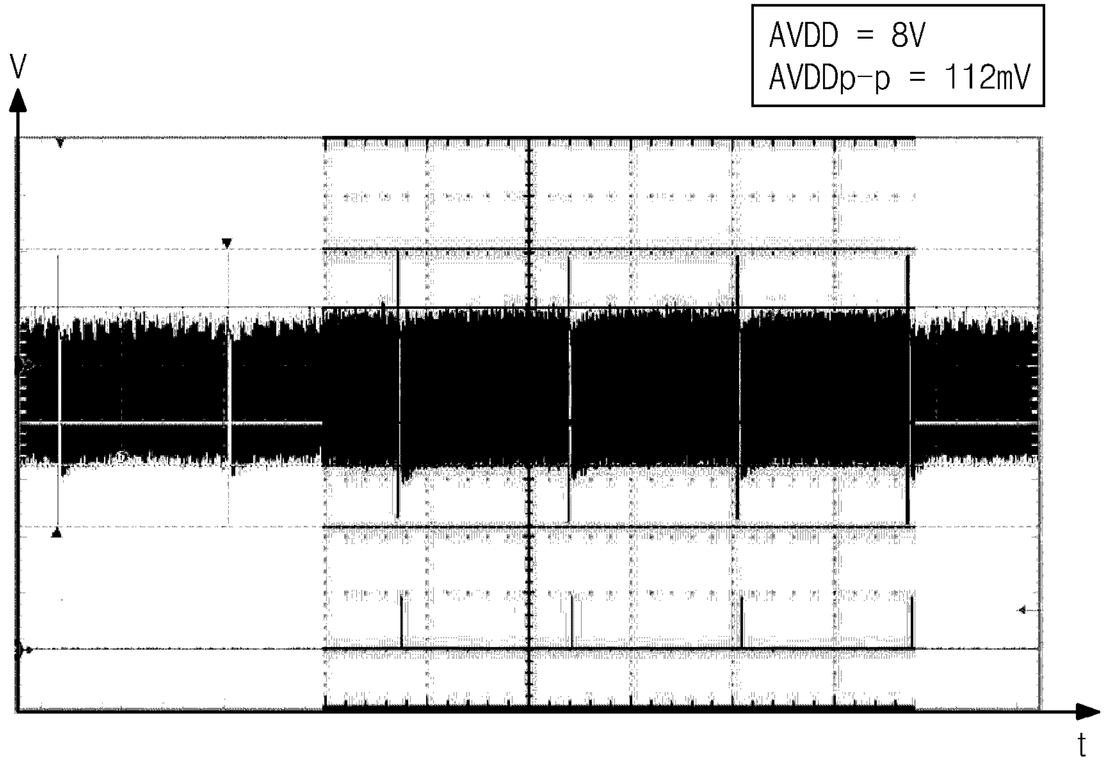

FIGS. 6B and 6C are diagrams showing a variation in an analog driving voltage that a voltage generator shown in FIG. 1 generates, when an image shown in FIG. 6A is displayed on a display panel.

As shown in FIG. 6B, the voltage generator 130 shown in FIG. 1 may generate an analog driving voltage AVDD of 10V. Referring to FIGS. 6A and 6B, when an image signal RGB provided from an external device to the timing controller 120 has an image pattern shown in FIG. 6A, a peak-to-peak voltage of a ripple of the analog driving voltage AVDD may be 158 mV, when the analog driving voltage AVDD is 10V.

When an image signal RGB provided from an external device to the timing controller 120 has an image pattern shown in FIG. 6A, the timing controller 120 may output a voltage control signal VL to decrease a voltage level of the analog driving voltage AVDD.

Referring to FIG. 6C, the voltage generator 130 may generate the analog driving voltage AVDD of 8V. In the event that an image signal RGB provided from the external device to the timing controller 120 has an image pattern shown in FIG. 6A, a peak-to-peak voltage of a ripple of the analog driving voltage AVDD may be 112 mV, when the analog driving voltage AVDD is 8V.

Referring to FIGS. 6B and 6C, if a voltage level of the analog driving voltage AVDD is decreased when the same image signal RGB is received, a peak-to-peak value of a ripple of the analog driving voltage AVDD may be reduced. As a ripple of the analog driving voltage AVDD is reduced, vibration of the capacitor C1 shown in FIG. 3 may be decreased. Thus, it is possible to reduce a vibration noise of the capacitor C1.

Referring to FIG. 7A, when an image signal RGB corresponding to a white gray scale is provided to all pixels PX of a display panel 110 during one frame, the amount of charges discharged through liquid crystal capacitors of the pixels PX may be comparably less varied.

Figure 7B:
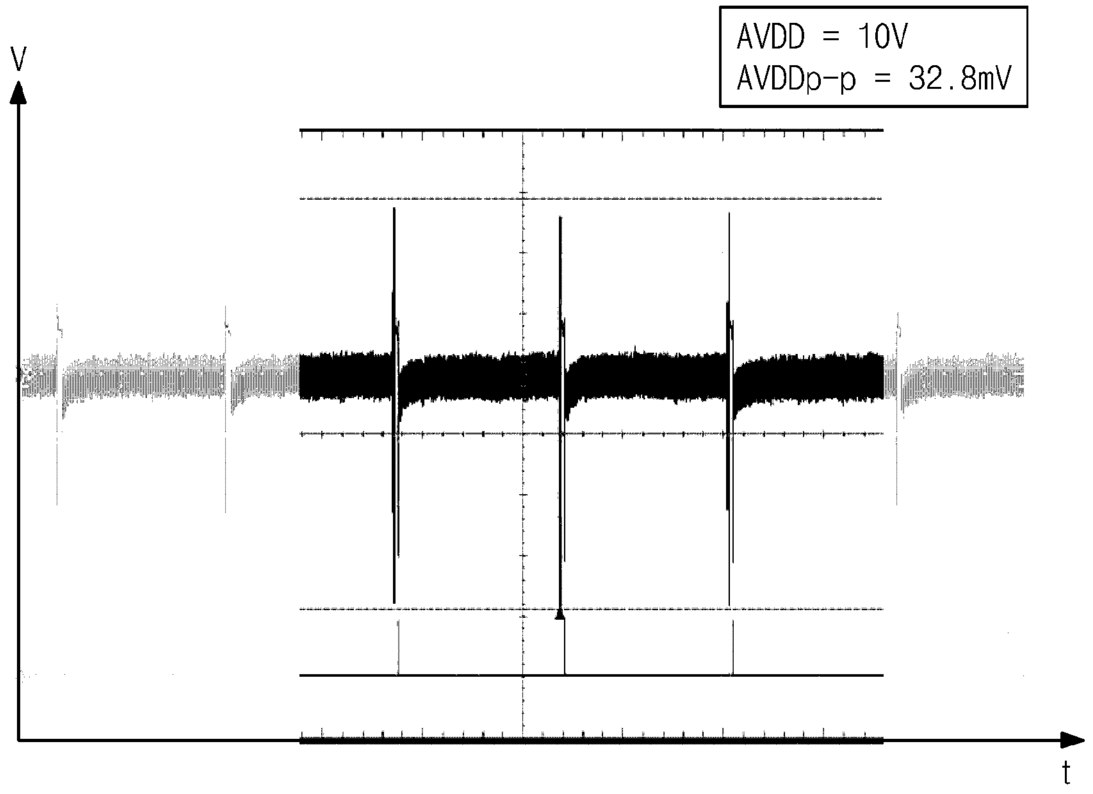
FIGS. 7B and 7C are diagrams showing a variation in an analog driving voltage that a voltage generator shown in FIG. 1 generates, when an image shown in FIG. 7A is displayed on a display panel.
Figure 7C:
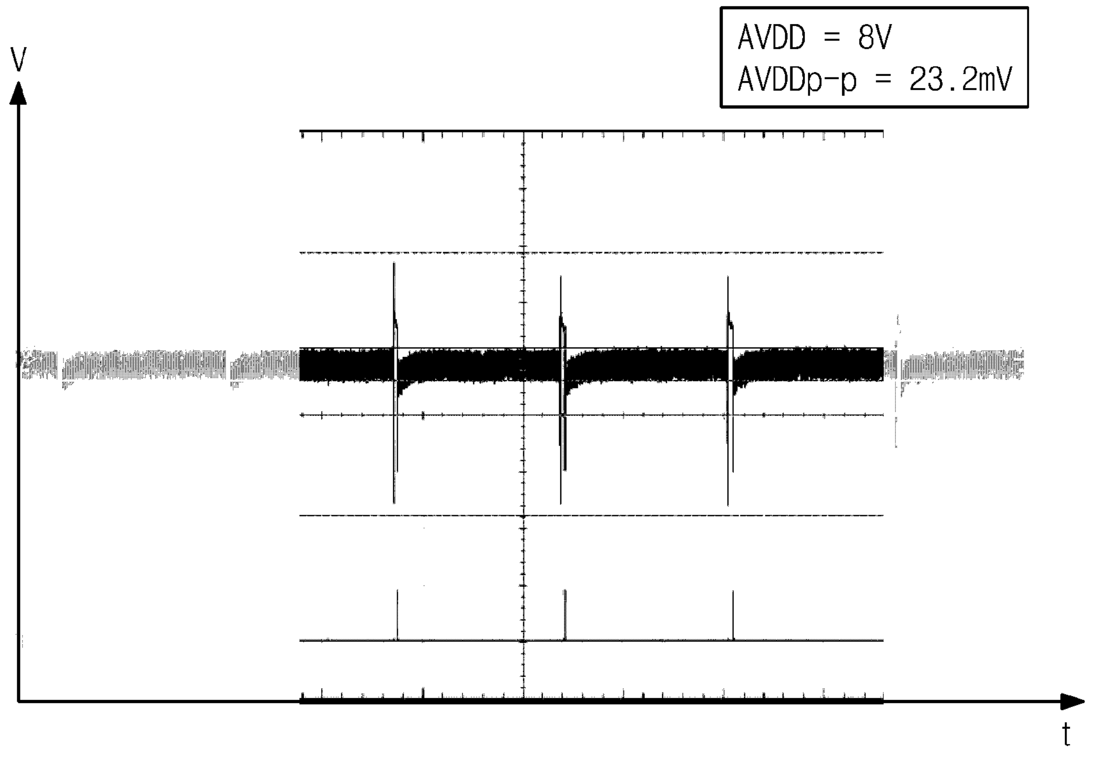

FIGS. 7B and 7C are diagrams showing a variation in an analog driving voltage that a voltage generator shown in FIG. 1 generates, when an image shown in FIG. 7A is displayed on a display panel.

As shown in FIG. 7B, a voltage generator 130 shown in FIG. 1 may generate an analog driving voltage AVDD of 10V. Referring to FIGS. 7A and 7B, when an image signal RGB provided from an external device to a timing controller 120 has an image pattern shown in FIG. 7A, a peak-to-peak voltage of a ripple of the analog driving voltage AVDD may be 32.8 mV, when the analog driving voltage AVDD is 10V.

Referring to FIG. 7C, the voltage generator 130 may generate the analog driving voltage AVDD of 8V. In the event that an image signal RGB provided from the external device to the timing controller 120 has an image pattern shown in FIG. 7A, a peak-to-peak voltage of a ripple of the analog driving voltage AVDD may be 23.2 mV when the analog driving voltage AVDD is 8V.

Referring to FIGS. 7B and 7C, when an image signal RGB is not varied, a peak-to-peak voltage of a ripple of the analog driving voltage AVDD may be comparably less varied, and the amount of reduced level of a peak-to-peak voltage of a ripple may be comparably small even if the voltage level of the analog driving voltage AVDD is reduced. Therefore, when an image signal RGB corresponding to an image pattern shown in FIG. 7A is received, the timing controller 120 may be configured to not change the voltage level of the analog driving voltage AVDD.

Referring to FIG. 8A, an image signal RGB corresponding to the maximum gray scale and an image signal RGB corresponding to the minimum gray scale may be alternately provided to each pixel PX in a first direction X1 and a second direction X2 of the display panel 110, and a ripple of the analog driving voltage AVDD may be generated due to a variation in the amount of charges discharged through liquid crystal capacitors of the pixels PX.

Figure 8B:
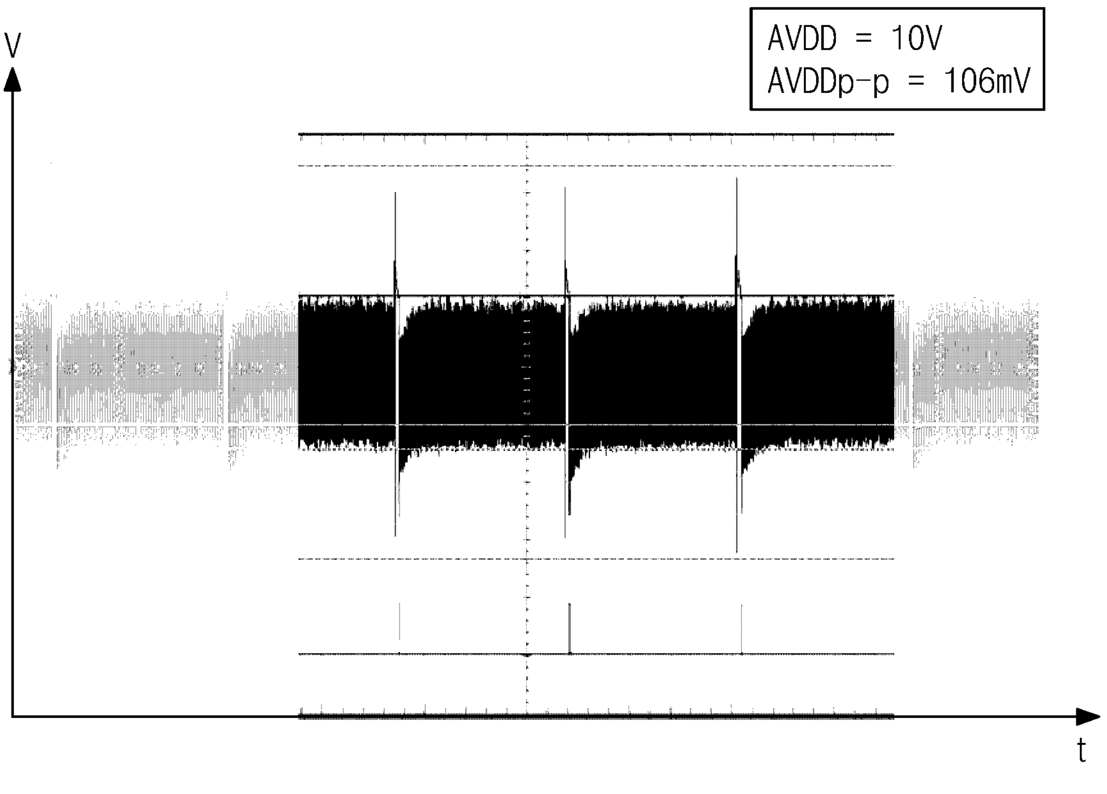
FIGS. 8B and 8C are diagrams showing a variation in an analog driving voltage that a voltage generator shown in FIG. 1 generates, when an image shown in FIG. 8A is displayed on a display panel.
Figure 8C:
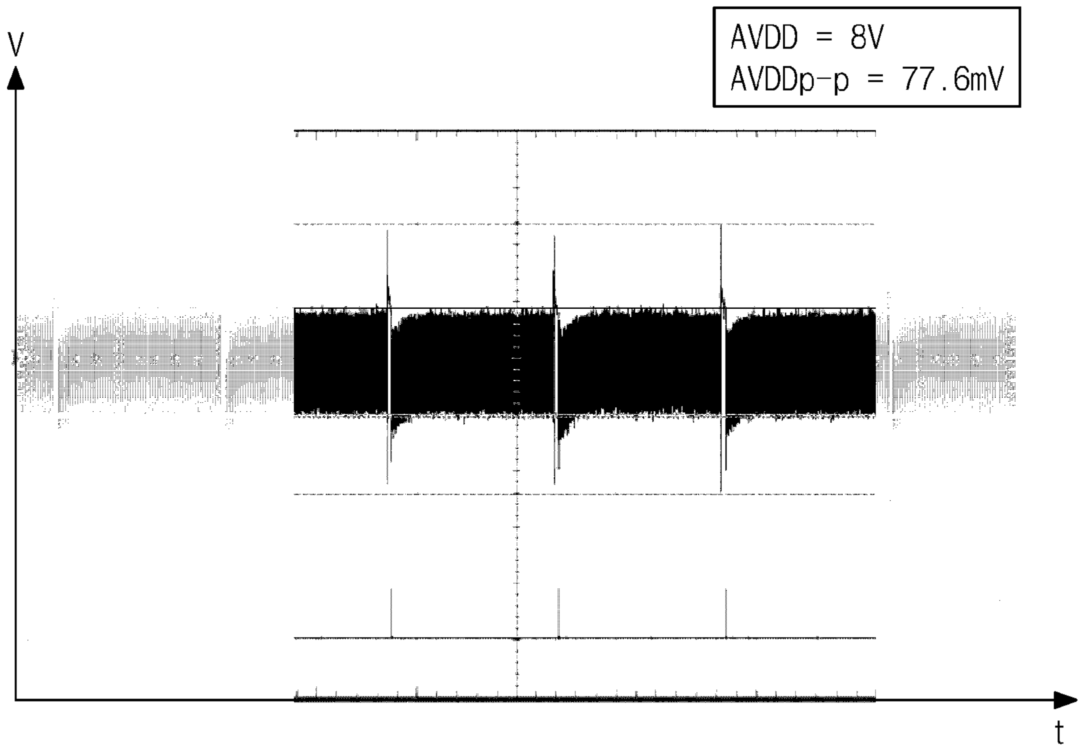

FIGS. 8B and 8C are diagrams showing a variation in an analog driving voltage that a voltage generator shown in FIG. 1 generates, when an image shown in FIG. 8A is displayed on a display panel.

As shown in FIG. 8B, a voltage generator 130 shown in FIG. 1 may generate an analog driving voltage AVDD of 10V. Referring to FIGS. 8A and 8B, in the event that an image signal RGB provided from an external device to a timing controller 120 has an image pattern shown in FIG. 8A, a peak-to-peak voltage AVDDp-p of a ripple of the analog driving voltage AVDD may be 106 mV when the analog driving voltage AVDD is 10V.

When an image signal RGB provided from an external device to the timing controller 120 has an image pattern shown in FIG. 8A, the timing controller 120 may output a voltage control signal VL to decrease a voltage level of the analog driving voltage AVDD.

Referring to FIG. 8C, the voltage generator 130 may generate the analog driving voltage AVDD of 8V. In the event that an image signal RGB provided from the external device to the timing controller 120 has an image pattern shown in FIG. 8A and when the analog driving voltage AVDD is 8V, a peak-to-peak voltage AVDDp-p of a ripple of the analog driving voltage AVDD may be 77.6 mV.

Referring to FIGS. 8B and 8C, if a voltage level of the analog driving voltage AVDD is decreased when the same image signal RGB is received, a peak-to-peak voltage AVDDp-p of a ripple of the analog driving voltage AVDD may be reduced. As a ripple of the analog driving voltage AVDD is reduced, vibration of a capacitor C1 shown in FIG. 3 may be decreased. Thus, it is possible to reduce a vibration noise of the capacitor C1.

Figure 9:
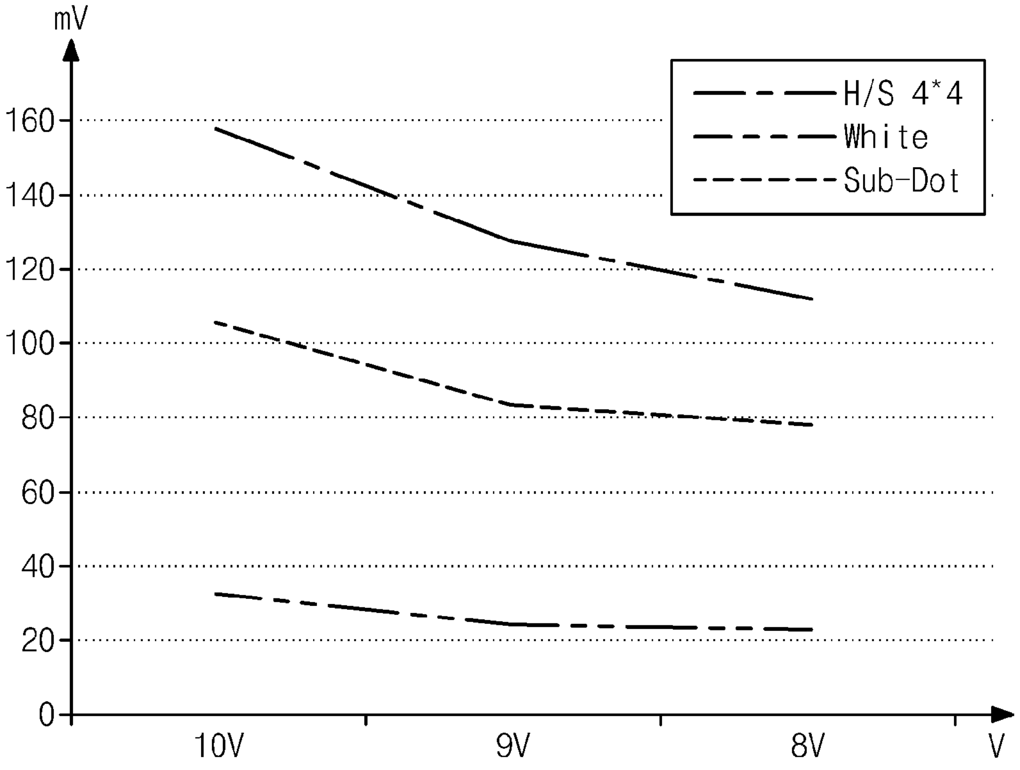
FIG. 9 is a graph showing a variation in a ripple according to a variation in a voltage level of an analog driving voltage.

FIG. 9 is a graph showing a variation in a ripple according to a variation in a voltage level of an analog driving voltage.

The image pattern shown in FIG. 6A may be referred to as a horizontal stripe 4*4 pattern H/S 4*4, the image pattern shown in FIG. 7A may be referred to as a white pattern White, and an image pattern shown in FIG. 8A may be referred to as a sub dot pattern Sub-Dot.

As illustrated in FIG. 9, when an image signal corresponding to each of the image patterns H/S 4*4, White, and Sub-Dot is received and a voltage level of an analog driving voltage AVDD is decreased, a voltage level of a ripple of the analog driving voltage AVDD may be reduced.

Figure 10:
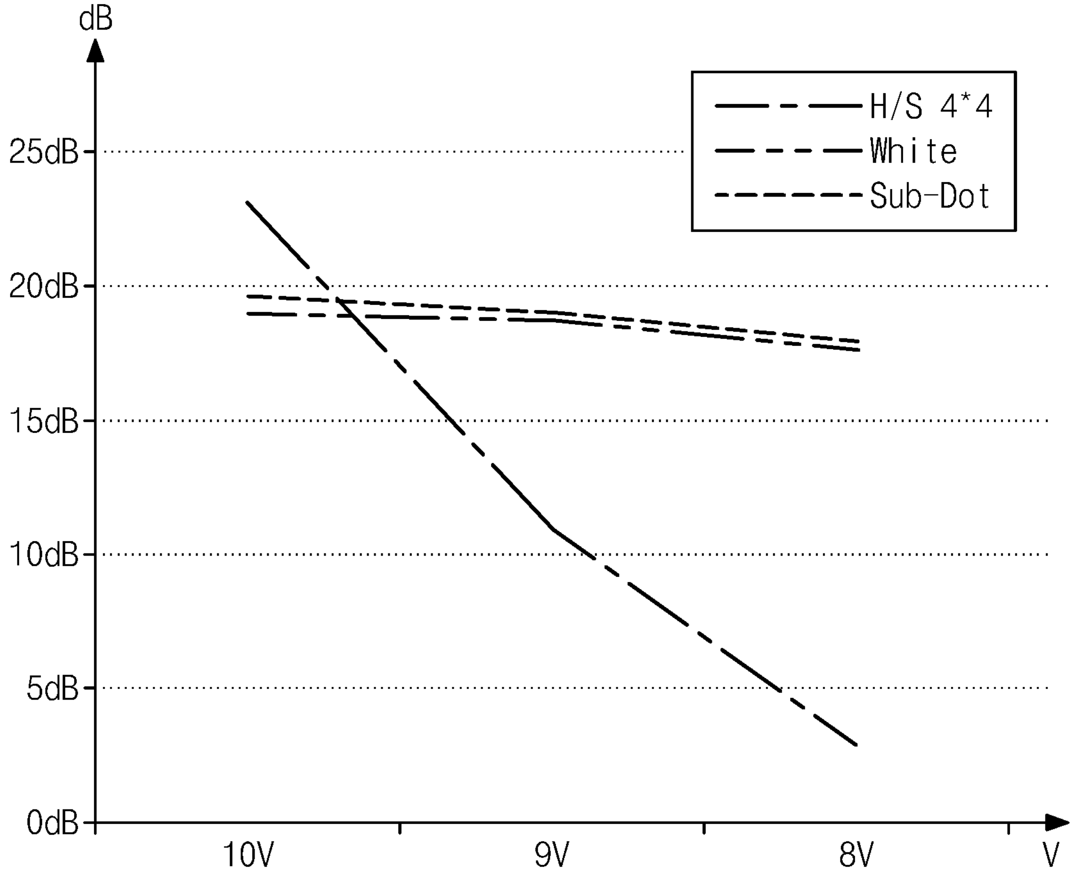
FIG. 10 is a graph showing a variation in an electromagnetic noise according to a variation in a voltage level of an analog driving voltage.

FIG. 10 is a graph showing a variation in an electromagnetic noise according to a variation in a voltage level of an analog driving voltage.

As illustrated in FIG. 10, an electromagnetic noise may be remarkably reduced when an image signal RGB corresponding to the image pattern H/S 4*4 shown in FIG. 6A is received.

When an image signal RGB corresponding to a specific pattern is received, the electromagnetic noise and power consumption may be reduced by lowering a voltage level of an analog driving voltage AVDD.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A display device, comprising:

a display panel comprising pixels;

a driver circuit configured to display an image on the display panel in response to an image signal and a control signal; and a voltage generator configured to generate an analog driving voltage for an operation of the driver circuit in response to a voltage control signal, wherein the driver circuit comprises:

a pattern detector configured to compare the image signal with the ripple image patterns and to output a detection signal in response to the comparison;

a timing counter configured to output a timing signal;

a sequence controller configured to output an index signal in response to the detection signal and the timing signal; and a voltage controller configured to output the voltage control signal in response to the index signal, and wherein the driver circuit is configured to compare the image signal to ripple image patterns and is configured to output the voltage control signal to change a voltage level of the analog driving voltage, according to a result of the comparison.

2. The display device of claim 1, further comprising:

data lines extending in a first direction; and gate lines extending in a second direction perpendicular to the first direction, wherein each of the pixels is respectively arranged at intersections of the gate lines and the data lines, and wherein the driver circuit comprises:

a data driver configured to drive the data lines;

a gate driver configured to drive the gate lines; and a timing controller configured to provide the data driver with an image data signal and a first control signal in response to the image signal and the control signal, and configured to output the voltage control signal.

3. The display device of claim 2, wherein the timing controller comprises:

a voltage controller configured to output the voltage control signal in response to the image signal and the control signal.

4. The display device of claim 3, wherein the voltage controller comprises:

a pattern detector configured to compare the image signal with ripple image patterns and to output a detection signal in response to the comparison;

a timing counter configured to output a timing signal;

a sequence controller configured to output an index signal in response to the detection signal and the timing signal; and a voltage controller configured to output the voltage control signal in response to the index signal.

5. The display device of claim 4, wherein the sequence controller is further configured to decrease a level of the index signal if the detection signal has an active level when the timing signal is activated.

6. The display device of claim 5, wherein the sequence controller is further configured to decrease the level of the index signal by a set decrease value if the detection signal has an active level when the timing signal is activated.

7. The display device of claim 6, wherein the sequence controller is further configured to maintain the level of the index signal when the index signal reaches a set minimum value.

8. The display device of claim 5, wherein the sequence controller is further configured to increase the level of the index signal if the detection signal does not have an active level when the timing signal is activated and the level of the index signal is lower than a set maximum value.

9. The display device of claim 8, wherein the sequence controller is further configured to increase the level of the index signal by a set increase value.

10. The display device of claim 1, wherein the voltage generator comprises:

an analog driving voltage generator configured to convert a power supply voltage into the analog driving voltage in response to the voltage control signal, and configured to output the analog driving voltage to an output terminal; and a capacitor connected between the output terminal and a ground voltage source.

11. The display device of claim 10, wherein the capacitor is a multi-layered ceramic capacitor.

12. A method of driving a display panel, the method comprising:

comparing an image signal to ripple image patterns;

outputting a voltage control signal in response to the comparison;

generating an analog driving voltage in response to the voltage control signal; and outputting gray scale voltages for driving data lines in response to an image data signal and the analog driving voltage, wherein the outputting a voltage control signal in response to the comparison comprises:

generating a detection signal in response to the comparison;

generating a timing signal in response to a control signal;

generating an index signal in response to the detection signal and the timing signal; and outputting a voltage control signal in response of the index signal.

13. The method of claim 12, wherein the generating an index signal further comprises:

decreasing the level of the index signal by a set decrease value if the detection signal has the active level when the timing signal is activated.

14. The method of claim 13, wherein the generating an index signal further comprises:

maintaining the level of the index signal when the index signal reaches a set minimum value.

15. The method of claim 13, wherein the generating an index signal further comprises:

increasing the level of the index signal by a set increase value if the detection signal does not have active level when the timing signal is activated and the level of the index signal is lower than a set maximum value.

* * * * *